(12) United States Patent
Nakajima

(10) Patent No.: US 11,818,571 B2
(45) Date of Patent: Nov. 14, 2023

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Takafumi Nakajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 17/551,023

(22) Filed: Dec. 14, 2021

(65) Prior Publication Data

US 2022/0109989 A1 Apr. 7, 2022

Related U.S. Application Data

(60) Continuation of application No. 16/528,259, filed on Jul. 31, 2019, now Pat. No. 11,228,909, which is a division of application No. 15/210,745, filed on Jul. 14, 2016, now Pat. No. 10,390,223.

(30) Foreign Application Priority Data

Jul. 21, 2015 (JP) .................. 2015-144401

(51) Int. Cl.
*H04W 12/06* (2021.01)
*H04W 4/80* (2018.01)
*H04W 12/50* (2021.01)
*H04W 12/77* (2021.01)

(52) U.S. Cl.
CPC ............. *H04W 12/06* (2013.01); *H04W 4/80* (2018.02); *H04W 12/50* (2021.01); *H04W 12/77* (2021.01)

(58) Field of Classification Search
CPC ....... H04W 4/80; H04W 12/50; H04W 12/06; H04W 4/029; H04W 84/18; H04W 76/14; H04W 8/005; H04W 84/12; H04W 12/63; H04W 76/11; H04L 67/12; H04L 63/0861; H04L 63/08; H04L 12/2807; H04L 12/2814; H04L 63/0823; H04L 65/1036; H04L 65/4084; H04L 63/083; H04L 63/0884; H04L 67/10; G06F 21/35; G06F 3/04817; G06F 21/32; G06F 3/04842; G06F 21/34; G06F 3/0482; G06F 13/382; G06F 16/685; G06F 21/44
USPC ............ 726/7, 2, 21, 36; 713/150, 163, 181; 380/255, 264, 276
See application file for complete search history.

(56) References Cited

U.S. PATENT DOCUMENTS

| 8,467,770 | B1 * | 6/2013 | Ben Ayed | G06F 21/35 |
| | | | | 455/411 |
| 9,026,053 | B2 * | 5/2015 | Molettiere | A61B 5/112 |
| | | | | 455/41.2 |
| 11,520,870 | B2 * | 12/2022 | Xia | H04L 63/083 |

(Continued)

*Primary Examiner* — Sharif E Ullah
(74) *Attorney, Agent, or Firm* — Canon U.S.A., Inc. IP Division

(57) ABSTRACT

A communication apparatus acquires information about a communication-parameter setting process from a different communication apparatus and determines whether the acquired information includes identification information for identifying the different communication apparatus. If it is determined that the identification information is included, an authentication request is transmitted by unicast based on the identification information. If it is determined that the identification information is not included, the authentication request is transmitted by broadcast.

13 Claims, 5 Drawing Sheets

(56) References Cited

U.S. PATENT DOCUMENTS

| | | | | |
|---|---|---|---|---|
| 2006/0199537 A1* | 9/2006 | Eisenbach | ........... | G06F 21/6245 |
| | | | | 455/41.2 |
| 2009/0222910 A1* | 9/2009 | Le Bihan | .............. | H04L 9/3273 |
| | | | | 726/19 |
| 2011/0314153 A1* | 12/2011 | Bathiche | ............... | H04W 12/06 |
| | | | | 709/225 |
| 2013/0268758 A1* | 10/2013 | Schrecker | ........... | H04W 12/069 |
| | | | | 713/168 |
| 2014/0165090 A1* | 6/2014 | Andreasen | .......... | H04L 63/0815 |
| | | | | 725/25 |
| 2016/0234758 A1* | 8/2016 | Qi | ........................ | H04W 48/14 |

* cited by examiner

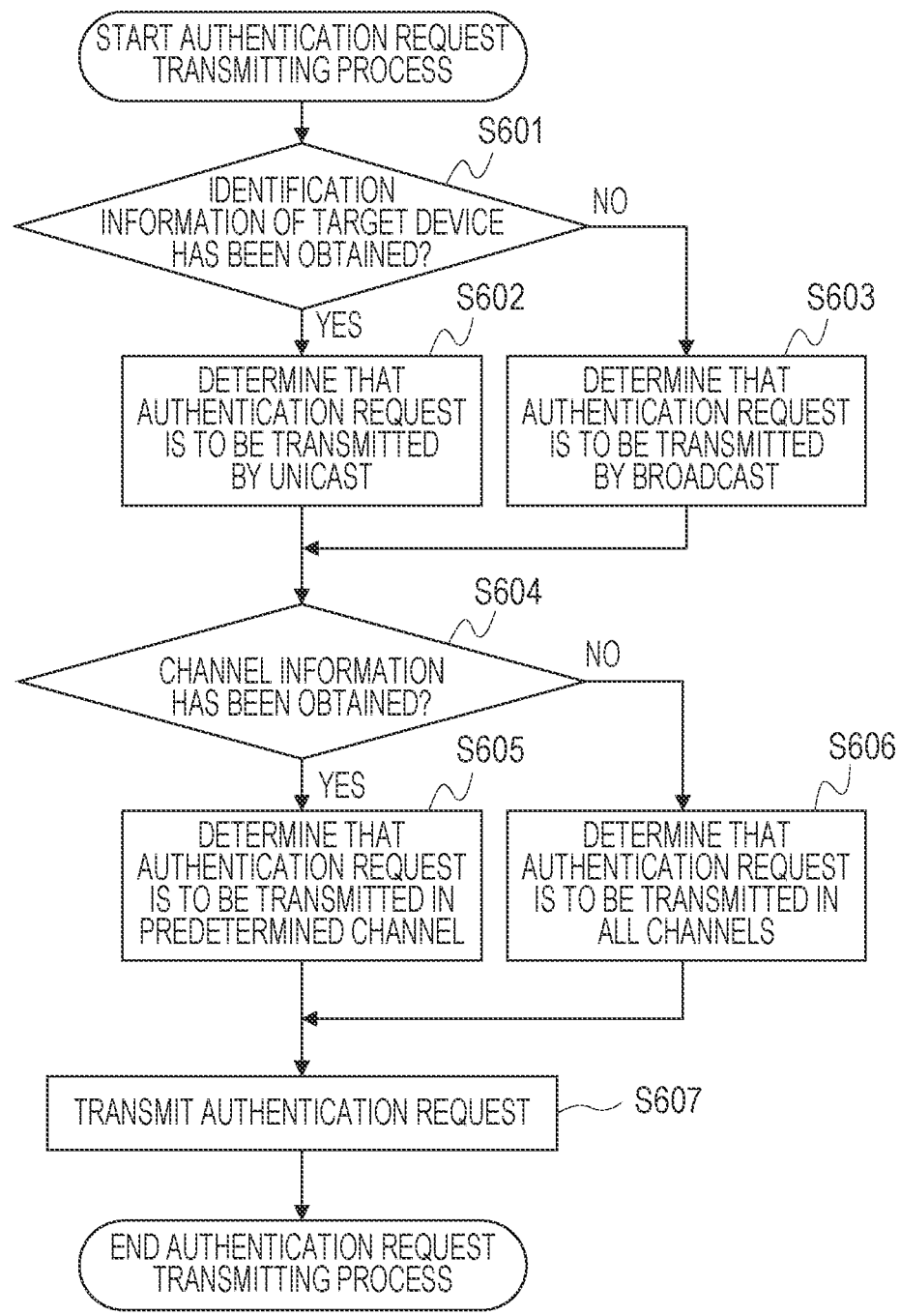

COMMUNICATION APPARATUS, COMMUNICATION METHOD, AND STORAGE MEDIUM

CROSS-REFERENCE TO RELATED APPLICATIONS

This application is a Continuation of U.S. patent application Ser. No. 16/528,259, filed Jul. 31, 2019, which is a Division of U.S. patent application Ser. No. 15/210,745, filed Jul. 14, 2016, now U.S. Pat. No. 10,390,223, which claims the benefit of Japanese Patent Application No. 2015-144401, filed Jul. 21, 2015, all of which are hereby incorporated by reference herein in their entirety.

BACKGROUND

Field

Aspects of the present invention generally relate to communication technology.

Description of the Related Art

Recently, it has been observed that electronic devices, such as a digital camera, a printer, a cellular phone, smartphones, etc., are provided with a wireless communication function enabling them to connect to wireless networks. In particular, these devices are using their wireless communication functions to communicate with each other via a wireless local-area network (LAN).

To connect electronic devices to a wireless network, it is necessary to set various communication parameters, such as an encryption method, an encryption key, an authentication method, an authentication key, etc. As a technique for facilitating setting of these communication parameters, it has been proposed that a mobile terminal read a quick response (QR) Code® that indicates communication parameters and that is displayed by an electronic device, and set the read communication parameters to an access point (see Japanese Patent Laid-Open No. 2014-60623).

As described in Japanese Patent Laid-Open No. 2014-60623, capturing of an image of code information such as a two-dimensional code in which a large amount of information is encoded triggers setting of communication parameters. This alleviates troublesome input operations performed by a user. In Japanese Patent Laid-Open No. 2014-60623, a method is described in which a QR Code® including identification information for identifying a device presenting the QR Code® is displayed, and in which a device photographing the QR Code® specifies a target device to which communication parameters are to be set.

Identification information with which a device is identified can be dynamically changed. For example, an administrator or the like can rewrite a MAC address in a wireless LAN when necessary. In Wi-Fi Direct®, there are two types of identification information of a device, the P2P device address and P2P interface address. In Wi-Fi Direct®, protocol processing is performed to form a wireless network (P2P group). When a P2P group is to be formed, the P2P interface address is used to identify a device. After a P2P group is formed, the P2P interface address is used to identify a device in communication in the P2P group. Any value can be set to the P2P device address and P2P interface address in a device, and different values can be dynamically set to the P2P device address and P2P interface address.

When identification information of a device is thus allowed to be dynamically changed, a device capable of displaying a QR Code® for which information is dynamically changed can display its identification information that has been changed as appropriate. However, when a QR Code® is displayed on a label or the like, it is not possible to dynamically change information indicated by the QR Code®. Therefore, under such circumstances, it is not possible for a QR Code® to include information for identifying a device.

SUMMARY

Aspects of the present invention provide a communication apparatus that performs a communication-parameter setting process efficiently in accordance with whether identification information of an apparatus with which the communication-parameter setting process is to be performed has been obtained.

According to an aspect of the present invention, a communication apparatus includes an acquiring unit, a determination unit, and a transmitting unit. The acquiring unit acquires, from a different communication apparatus, information about a communication-parameter setting process. The determination unit determines whether the acquired information includes identification information for identifying the different communication apparatus. The transmitting unit transmits, when an authentication request used in an authentication process performed in the communication-parameter setting process is to be transmitted, if the determination unit determines that the identification information is included, the authentication request by unicast based on the identification information and by broadcast if the determination unit determines that the identification information is not included.

Further features of aspects of the present invention will become apparent from the following description of exemplary embodiments with reference to the attached drawings.

BRIEF DESCRIPTION OF THE DRAWINGS

FIG. 6 is a flowchart of an exemplary operation performed by the smartphone.

DESCRIPTION OF THE EMBODIMENTS

Figure 1:
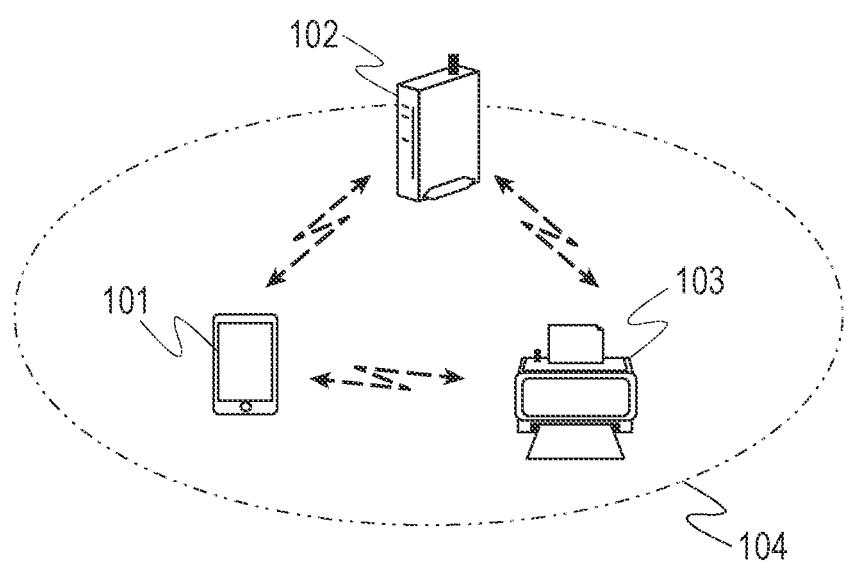
FIG. 1 is a diagram illustrating an exemplary configuration of a communication system.

FIG. 1 illustrates the configuration of a communication system according to the present embodiment. FIG. 1 illustrates a smartphone 101 and an access point (hereinafter referred to as an AP) 102 that is a base station. FIG. 1 also illustrates a printer 103 and a wireless network 104 formed among the apparatuses in the communication system. In the present embodiment, the wireless network 104 illustrated in FIG. 1 is a wireless local-area network (LAN) based on the IEEE (The Institute of Electrical and Electronics Engineers, Inc.) 802.11 series. The wireless network 104 is also a wireless network formed by the AP 102. However, the configuration in which apparatuses communicate with one another is not necessarily limited to a wireless LAN based on IEEE 802.11.

In the description below, a case in which a parameter setting process for establishing a wireless LAN connection between the AP 102 and the printer 103 is performed via the smartphone 101 will be described.

Communication parameters include various wireless communication parameters for performing wireless communication based on the IEEE 802.11 standard. That is, the communication parameters include wireless communication parameters necessary to perform wireless LAN communication, such as a service set identifier (SSID) serving as a network identifier, an encryption method, an encryption key, an authentication method, and an authentication key. The communication parameters can also include an Internet Protocol (IP) address for performing communication in the IP layer. In the present embodiment, the smartphone 101, the AP 102, and the printer 103 are provided with a wireless LAN communication function.

In the present embodiment, the communication-parameter setting process is first performed between the smartphone 101 and the AP 102. In this process, the smartphone 101 sets communication parameters for constructing the wireless network 104, to the AP 102. By using communication parameters obtained from the smartphone 101, the AP 102 constructs the wireless network 104. Subsequently, the communication-parameter setting process is performed between the smartphone 101 and the printer 103. In this process, the smartphone 101 provides communication parameters to the printer 103. By using the obtained communication parameters, the printer 103 establishes a connection with the wireless network 104 constructed by the AP 102. A description will be made by taking a smartphone, a printer, and an AP as exemplary communication apparatuses in the communication system according to the present embodiment. Instead, for example, other communication apparatuses, such as a digital camera, a video camera, a smartwatch, a personal digital assistant (PDA), various digital household appliances, can be used. The AP can be a communication apparatus, such as a smartphone, a printer, or a digital camera, which is provided with an AP function.

Figure 2:
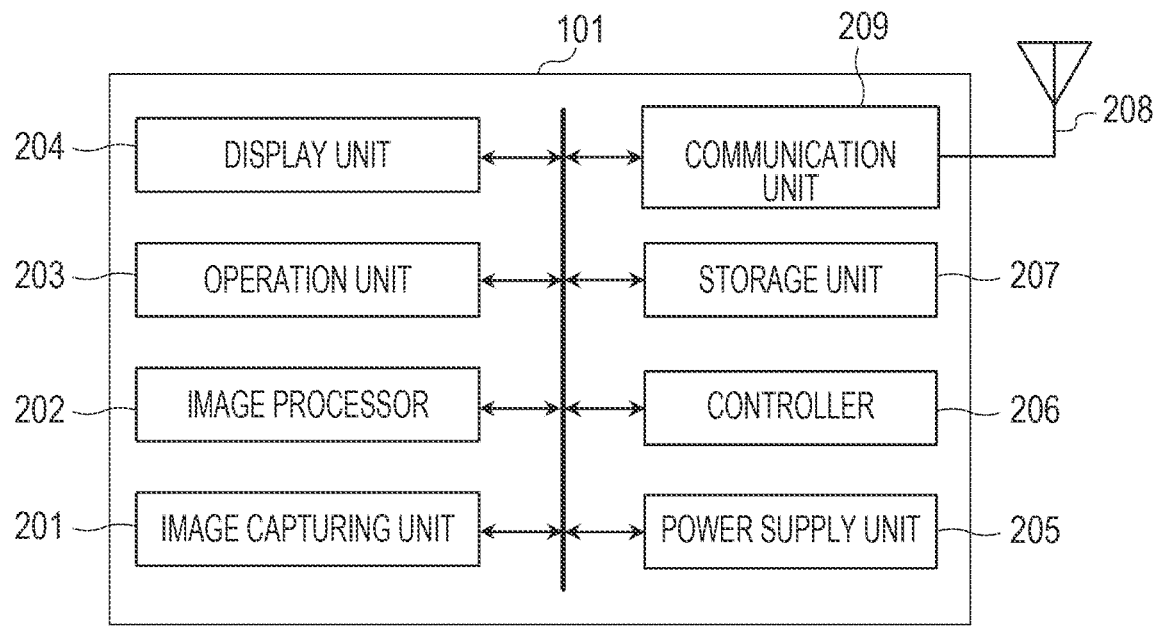
FIG. 2 is a diagram illustrating the configuration of a smartphone.

The hardware configuration of a communication apparatus according to the present embodiment will be described by using FIG. 2. FIG. 2 illustrates the entire smartphone 101. An image capturing unit 201 includes a charge-coupled device (CCD) and a lens. The image capturing unit 201 captures an image and a movie. For example, the image capturing unit 201 photographs and reads code information, such as a bar code, a two-dimensional code, or a quick response (QR) code. An image processor 202 performs image processing on an image or the like captured by the image capturing unit 201. The image processor 202 decodes and analyzes the code information such as a QR Code®, as described below. The image processor 202 analyzes an image captured by the image capturing unit 201, and decodes encoded information so as to obtain the decoded information.

An operation unit 203 is used to operate the smartphone 101, and includes operation buttons. The operation unit 203 stores a flag corresponding to an input, in a memory such as a storage unit 207. A display unit 204 is provided with a function of outputting at least one of visual information and sound information. In the case where the display unit 204 displays visual information, the display unit 204 includes a video random-access memory (VRAM) for storing image data corresponding to visual information that is to be displayed. The display unit 204 performs display control so that image data stored in the VRAM is continuously displayed on a liquid crystal display (LCD) or a light-emitting diode (LED). A power supply unit 205 supplies power to the pieces of hardware in the smartphone 101. The power supply unit 205 is constituted, for example, by a battery.

A controller 206 executes control programs stored in the storage unit 207 so as to control the entire smartphone 101. Various operations described below are performed in such a manner that the controller 206 executes the control programs stored in the storage unit 207. The controller 206 is constituted, for example, by a central processing unit (CPU). The storage unit 207 stores various information, such as the control programs executed by the controller 206, and information about a communication target apparatus. The storage unit 207 is constituted, for example, by a storage medium, such as a hard disk drive (HDD), a flash memory, a removable secure digital (SD) card, a read-only memory (ROM), or a random-access memory (RAM).

An antenna 208 is capable of performing communication in a 2.4 GHz band and/or a 5 GHz band for wireless communication using a wireless LAN. A communication unit 209 is used to perform wireless communication using a wireless LAN based on the IEEE 802.11 series. In addition, protocol processing based on Wi-Fi Direct® defined by Wi-Fi Alliance® can be performed. The communication unit 209 is made up of a chip performing wireless communication.

Functions that are stored as programs in the storage unit 207 of the smartphone 101 and that are achieved by the controller 206 executing the programs will be described. The functions described below are achieved in such a manner that, according to the control programs, the controller 206 controls pieces of hardware, and computes and processes information.

The smartphone 101 performs a communication-parameter setting process of setting communication parameters to a peer apparatus. In the communication-parameter setting process, a providing apparatus provides communication parameters used in wireless communication, to a receiving apparatus. In the present embodiment, a case in which the smartphone 101 operates as the providing apparatus, and in which a peer apparatus (for example, the AP 102 or the printer 103) operates as the receiving apparatus will be described. However, this is not limiting. When the peer apparatus already has communication parameters, the smartphone 101 can obtain the communication parameters from the peer apparatus.

The communication-parameter setting process according to the present embodiment will be described below. The smartphone 101 photographs a QR Code® that is displayed on a different apparatus or that is associated with the different apparatus. The QR Code® associated with a different apparatus is, for example, a QR Code® attached on the case of the different apparatus or a QR Code® described in an instruction manual of the different apparatus.

The smartphone 101 obtains information that is included in the read QR code and that is necessary to perform the communication-parameter setting process. The information necessary to perform the communication-parameter setting process is, for example, communication parameters themselves, or information used in the communication-parameter setting process. Information used when the smartphone 101 searches for the apparatus presenting the QR Code® can be included. An example of information used in the searching is identification information for identifying the apparatus presenting the QR Code®. The identification information of an apparatus is a media access control (MAC) address, a universally unique identifier (UUID), or the like for uniquely identifying a network device. In the case of parameter setting in Wi-Fi Direct®, a P2P device address or a P2P interface address can be used. Further, channel information of a wireless LAN can be included as one piece of information used in the searching. Inclusion of channel information of a wireless LAN enables the smartphone 101 to search for the apparatus presenting the QR Code® by using only a predetermined channel, achieving a reduction in the processing time for the searching.

The smartphone 101 transmits a search signal to one or more peer apparatuses to perform the communication-parameter setting process with a peer apparatus based on the information obtained from the QR code, and searches for the peer apparatus with which the communication-parameter setting process is to be performed.

In the present embodiment, the smartphone 101 performs an authentication process with the peer apparatus. This process is an authentication process for identifying whether the peer apparatus is a valid partner with which the communication-parameter setting process is to be performed. In the authentication process, information included in the QR code can be used to perform authentication between the apparatuses. Instead, a hash value of the information included in the QR code can be calculated, and can be used as authentication information. In the present embodiment, information used when communication parameters are encrypted and transmitted is also shared between the smartphone 101 and the peer apparatus in the authentication process.

In the present embodiment, a case in which the search signal for performing the communication-parameter setting process is used as a signal for an authentication request in the authentication process will be described. However, this is not limiting. For example, the signal for performing the communication-parameter setting process can be a search signal such as a probe request based on the IEEE 802.11 standard. This is not limited to a probe request, and an action frame or the like for searching for a target communication apparatus can be used.

A secure wireless link between the smartphone 101 and the peer apparatus can be established, and the wireless link can be used to perform the authentication process and the communication-parameter setting process. Alternatively, a predetermined frame such as an action frame in a wireless LAN can be used to perform the authentication process and the communication-parameter setting process. At that time, an action frame itself may be encrypted. For example, the encryption may be performed on the basis of information about any common string that is set in the apparatuses.

When the smartphone 101 detects the peer apparatus and successfully performs the authentication process, the smartphone 101 encrypts communication parameters and sets the communication parameters to the peer apparatus through wireless communication. In the communication-parameter setting process, a public key can be used to perform encryption and encrypted information can be communicated. The public key can be included in the QR Code®. As a method of using a public key to encrypt communication parameters, a method disclosed in Japanese Patent Laid-Open No. 2014-230152 can be used.

In the present embodiment, a case in which information necessary to perform the communication-parameter setting process is obtained from a QR Code® will be described. However, this is not limiting. Alternatively, such information can be obtained through short range wireless communication such as near field communication (NFC). Instead, information can be transferred by using wireless communication other than wireless LAN communication, such as Bluetooth®. Further, wireless communication, such as IEEE 802.11ad or TransferJet®, can be used.

Instead, both of the apparatuses can transfer information necessary to set communication parameters, to each other in advance. For example, a secure link, an action frame, or the like can be used to obtain information about the peer apparatus. At that time, an action frame itself can be encrypted. For example, the encryption can be performed on the basis of information about any common string that is set in the apparatuses. At that time, the smartphone 101 and the peer apparatus can exchange information about the apparatuses with each other.

The smartphone 101 can register information about a peer apparatus to which communication parameters are to be set. An apparatus to be registered can be an apparatus with which communication parameters have been shared before, or an apparatus to which a connection can be established through a secure link. Information about a peer apparatus to be registered can be obtained from a QR Code®. Alternatively, information about a peer apparatus to be registered can be information about a wireless network, such as an SSID used when wireless communication was performed with the peer apparatus the last time.

Figure 3:
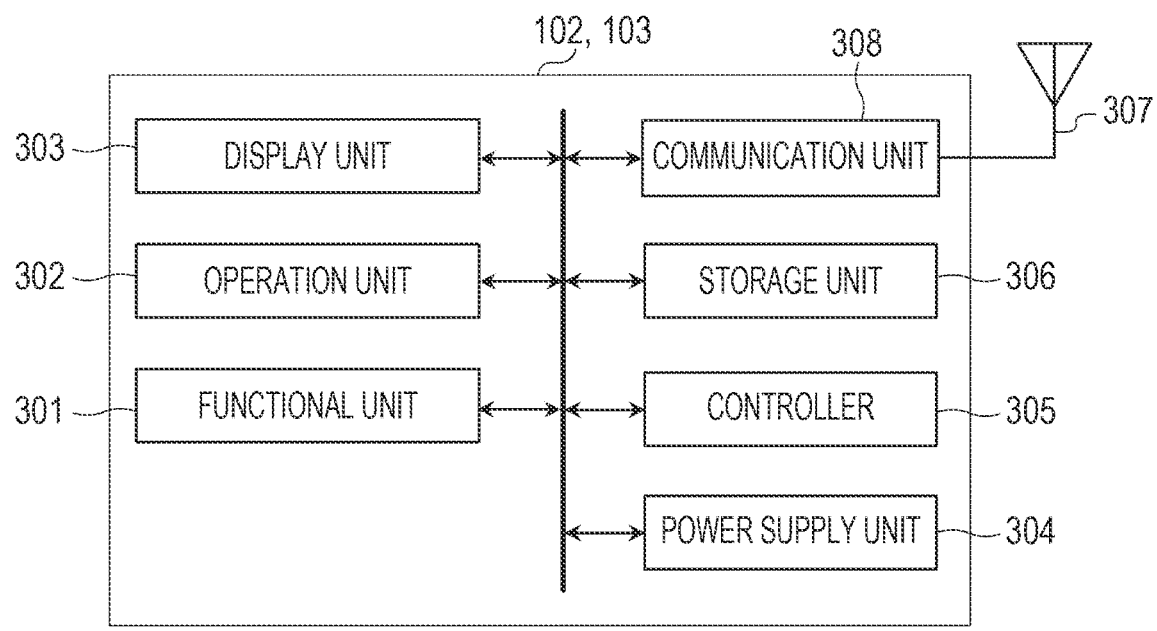
FIG. 3 is a diagram illustrating the configuration of an access point (AP) and a printer.

The configuration of an AP 102 and the printer 103 will be described by using FIG. 3. In FIG. 3, a functional unit 301 of the AP 102 is a control processor for operating as a wireless LAN base station. The functional unit 301 also includes hardware for performing functions of a functional unit. In the printer 103, the functional unit 301 is a print unit, and performs a print process. An operation unit 302 is a unit for operating the AP 102 or the printer 103, and includes operation buttons. The operation unit 302 stores a flag corresponding to an input, in a memory such as a storage unit 306. A display unit 303 is provided with a function of outputting at least one of visual information and sound information. When the display unit 303 displays visual information, the display unit 303 includes a VRAM for storing image data corresponding to visual information that is to be displayed. The display unit 303 performs display control so that image data stored in the VRAM is continuously displayed on an LCD or an LED. A power supply unit 304 supplies power to pieces of hardware of the AP 102 or the printer 103. The power supply unit 304 is constituted, for example, by a battery or an alternating current (AC) adaptor power supply.

A controller 305 controls the entire AP 102 or the entire printer 103 by executing control programs stored in the storage unit 306. The controller 305 executes the control programs stored in the storage unit 306, whereby various operations described below are performed. The controller 305 is constituted, for example, by a CPU. The storage unit 306 stores various types of information, such as the control programs executed by the controller 305, and information about a communication target apparatus. The storage unit 306 is constituted, for example, by a storage medium, such as an HDD, a flash memory, a removable SD card, a ROM, or a RAM.

An antenna 307 is capable of performing communication in a 2.4 GHz band and/or a 5 GHz band for wireless LAN communication. A communication unit 308 is a unit for performing wireless LAN communication based on the IEEE 802.11 series. The communication unit 308 is made up of a chip performing wireless communication.

Functions that are stored as programs in the storage unit 306 of the AP 102 or the printer 103 and that are achieved by the controller 305 executing the programs will be described. The functions described below are achieved in such a manner that, according to the control programs, the controller 305 controls pieces of hardware, and computes and processes information.

The AP 102 and the printer 103 are capable of performing the communication-parameter setting process in which communication parameters are shared between apparatuses. The AP 102 operates as an access point defined in IEEE 802.11, in communication performed by the communication unit 308. The printer 103 operates as a station defined in IEEE 802.11, in communication performed by the communication unit 308.

The printer 103 can generate a QR Code® including information necessary for the communication-parameter setting process. The generated QR Code® is displayed by the display unit 303 on an LCD or the like. Alternatively, the QR Code® can be printed in a print process performed by the functional unit 301.

The information necessary for the communication-parameter setting process is, for example, communication parameters themselves or information used in protocol processing for the communication-parameter setting process. Other than these, information necessary to set communication parameters is similar to that for the smartphone 101 described above, and no description will be made.

In the present embodiment, the QR Code® for the AP 102 is attached to the case as a label. Assume that the MAC address of the AP 102 can be rewritten under administrator authority, and that the QR Code® does not include the MAC address as identification information of the AP 102. In the present embodiment, assume that the QR Code® for the AP 102 does not include channel information. In the present embodiment, assume that the printer 103 is capable of dynamically displaying the QR Code® on the display unit 303. It is also assumed that the printer 103 is a device for which an administrator or the like can rewrite the MAC address of the printer 103 when necessary. When the printer 103 receives an instruction to start the communication-parameter setting process, the printer 103 displays a QR Code® obtained by encoding information including the MAC address that is being used when the instruction is received. Similarly, when the printer 103 receives an instruction to start the communication-parameter setting process, the printer 103 enters a state of waiting for an authentication request in the communication-parameter setting process in a fixed channel. The QR Code® for the printer 103 includes channel information as well as the MAC address. A MAC address is such an address that it is not possible for the same address to be assigned to multiple network devices in a duplicate manner. Therefore, in rewriting of a MAC address, when the processes described below are to be performed, the apparatuses can be set to the administrator mode in which only an administrator can perform an operation or the service mode in which only a serviceman can perform an operation, by using the IDs or the like. At that time, a check process can be added so that a MAC address to be set is not set to multiple apparatuses in a duplicate manner.

Operations performed by the communication system having the above-described configuration will be described. A case in which the smartphone 101 is used to perform the communication-parameter setting process with each of the AP 102 and the printer 103 in order that wireless LAN communication between the AP 102 and the printer 103 is performed will be described.

Figure 4:
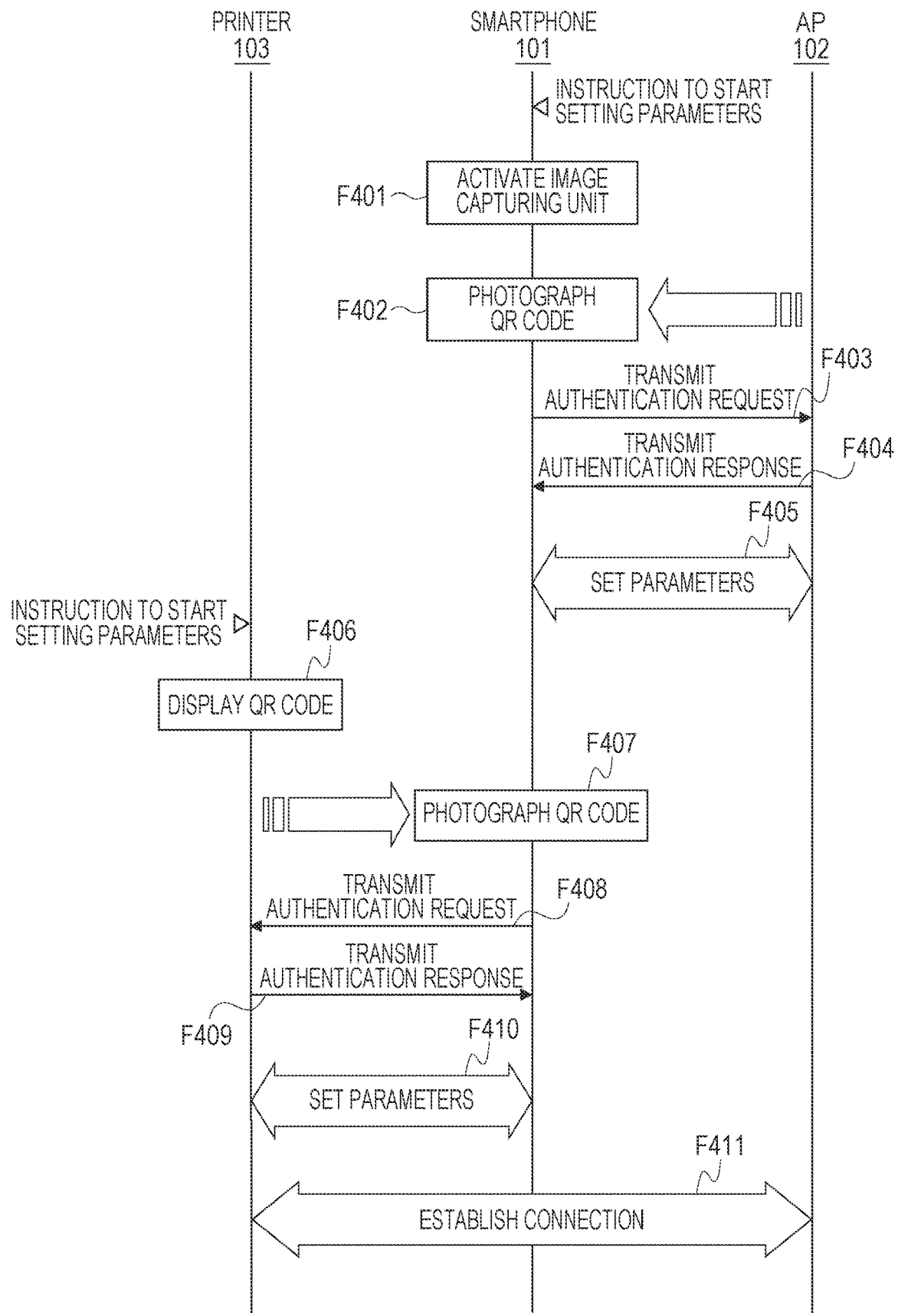
FIG. 4 is a diagram illustrating an exemplary operational sequence of the communication system.

A sequence chart for the communication system will be described by using FIG. 4. In the sequence chart in FIG. 4, a case in which the smartphone 101 is used to establish a wireless LAN connection between the AP 102 and the printer 103 will be described. In FIG. 4, the smartphone 101 first photographs the QR Code® prepared for the AP 102, and performs the parameter setting process with the AP 102. The AP 102 uses communication parameters obtained from the smartphone 101, so as to construct the wireless network 104. Subsequently, the smartphone 101 photographs the QR Code® prepared for the printer 103, and connects the printer 103 to the wireless network 104.

First, the smartphone 101 receives an instruction to start the communication-parameter setting process. When an instruction to start the communication-parameter setting process is received, a message such as "Photograph the QR Code® prepared for an AP" can be displayed on the display unit 204 of the smartphone 101. When the smartphone 101 receives an instruction to start the communication-parameter setting process, the smartphone 101 activates the image capturing unit 201 (F401). Then, the smartphone 101 photographs a QR Code® attached to the case of the AP 102 (F402).

After the photographing operation, the smartphone 101 transmits an authentication request to the AP 102 on the basis of information included in the QR Code® (F403). In the process in FIG. 5, which is described below, it is determined whether the authentication request is to be transmitted by unicast, broadcast or multicast and whether the authentication request is to be transmitted in a specific channel or all channels, based on the information included in the QR Code®. Transmission in all channels means that an authentication request is sequentially transmitted by switching among multiple channels available for the smartphone 101 in time-division manner. The process will be described below in detail. In this example, the authentication request is transmitted from the smartphone 101 to the AP 102 by broadcast in all channels. As described above, the authentication request including various types of information based on the information included in the obtained QR Code® is transmitted. When the AP 102 receives the authentication request, the AP 102 compares the authentication request with the information included in the QR Code® prepared for the AP 102, performs the authentication process, and transmits the authentication result as an authentication response to the smartphone 101 (F404).

When the authentication response is transmitted from the AP 102 and is received by the smartphone 101, the smartphone 101 analyzes the authentication result. When the authentication result indicates authentication success, information for encrypting communication parameters that are to be transferred between the smartphone 101 and the AP 102 can be shared between both of the apparatuses. When necessary, after the authentication response is received by the smartphone 101, information necessary for encryption can be transmitted from the smartphone 101 to the AP 102 again.

After the authentication process, the communication-parameter setting process is performed between the smartphone 101 and the AP 102, and communication parameters are transferred from the smartphone 101 to the AP 102 (F405). In the communication-parameter setting process, the communication parameters are encrypted in the smartphone 101 and the AP 102 based on the encrypting information shared in the authentication process, and the encrypted communication parameters are communicated. In the present embodiment, an authentication request, an authentication response, and various messages received/transmitted in the communication-parameter setting process are implemented by using an action frame used in a wireless LAN based on the IEEE 802.11 standard. Assume that the AP 102 is also capable of receiving/transmitting an action frame.

Upon completion of the communication-parameter setting process performed between the smartphone 101 and the AP 102, the AP 102 uses the communication parameters provided from the smartphone 101, so as to form the wireless network 104. When the AP 102 has already formed a wireless network by using different communication parameters, the AP 102 forms a wireless network again by using the communication parameters provided from the smartphone 101.

Subsequently, a user instructs the printer 103 to start the communication-parameter setting process. When the printer 103 receives an instruction to start the communication-parameter setting process, the printer 103 displays, on the display unit 303, a QR Code® obtained by encrypting information that includes the MAC address of the printer 103 that is being used at that time, and that also includes channel information for setting communication parameters (F406). The printer 103 enters a state of waiting for reception of an authentication request from a peer apparatus, in a channel for setting parameters.

The smartphone 101 photographs the QR Code® displayed on the display unit 303 of the printer 103, thereby obtaining information about the printer 103 (F407). After completion of the communication-parameter setting process performed with the AP 102, the smartphone 101 can automatically enter a state of being ready to photograph a QR Code®, or, by receiving again an instruction to start the communication-parameter setting process from a user, can enter a state of being ready to photograph a QR Code®. In the smartphone 101, photographing of a QR Code® prepared for the AP 102 can be followed by the following operations in sequence: photographing of the QR Code® prepared for the printer 103; authentication with the AP 102 and parameter setting; and authentication with the printer 103 and parameter setting. In this case, navigation can be made, such as sequential display of messages, "Photograph the QR Code® prepared for an AP" and "Photograph the QR Code® prepared for a printer", on the display unit 204 of the smartphone 101. After photographing of a QR Code®, the smartphone 101 transmits an authentication request to the printer 103 based on the information included in the QR Code® (F408). At that time, in the process in FIG. 5, which is described below, it is determined whether the authentication request is to be transmitted by unicast, broadcast, or multicast and whether the authentication request is to be transmitted in a specific channel or all channels, based on the information included in the QR Code®. The process will be described in detail below. In this example, the authentication request is transmitted from the smartphone 101 to the printer 103 by unicast in a specific channel indicated by the QR Code®. Since the printer 103 has entered the state of waiting for reception of an authentication request in the channel, the printer 103 is capable of receiving an authentication request transmitted from a peer apparatus at once. As described above, the authentication request including various types of information based on the information included in the QR Code® is transmitted. When the printer 103 receives the authentication request, the printer 103 compares information included in the authentication request with the information included in the QR Code® prepared for the printer 103, performs the authentication process, and transmits the authentication result as an authentication response to the smartphone 101 (F409).

When the smartphone 101 receives the authentication response transmitted from the printer 103, the smartphone 101 analyzes the authentication result. When the analysis result indicates authentication success, information for encrypting communication parameters that are to be transferred between the smartphone 101 and the printer 103 can be shared between both of the apparatuses. When necessary, after the smartphone 101 receives the authentication response, information necessary for encryption can be transmitted again from the smartphone 101 to the printer 103.

After the authentication process is performed, the communication-parameter setting process is performed between the smartphone 101 and the printer 103, and communication parameters are transmitted from the smartphone 101 to the printer 103 (F410). In the communication-parameter setting process, information is encrypted in the smartphone 101 and the printer 103 based on the encrypting information shared in the authentication process, and the encrypted information is communicated. In the present embodiment, an authentication request, an authentication response, and various messages that are received/transmitted in the communication-parameter setting process are implemented by using an action frame used in a wireless LAN. Assume that the printer 103 is also capable of receiving/transmitting an action frame. The communication parameters transmitted from the smartphone 101 to the printer 103 are communication parameters for the wireless network 104 constructed by the AP 102.

Upon completion of setting of communication parameters in the printer 103, the printer 103 uses the communication parameters transmitted from the smartphone 101 to establish a wireless LAN connection to the wireless network 104 (F411). In order to reduce a search time in which the printer 103 searches for the AP 102, the communication parameters including information for specifying the AP 102 can be transferred from the smartphone 101 to the printer 103. As information for specifying the AP 102, the MAC address of the AP 102, channel information of the wireless network 104, a frequency bandwidth that is operating, or the like can be used. Alternatively, the communication parameters can be transmitted in such a manner that the communication parameters include information for sharing information for specifying both the printer 103 and the AP 102, between the apparatuses. The information for specifying both of the apparatuses can be information related to the public keys of both of the apparatuses which are included in the QR Codes®.

The above-described sequence enables the AP 102 to form the wireless network 104, and enables the printer 103 to participate in the wireless network 104.

Figure 5:
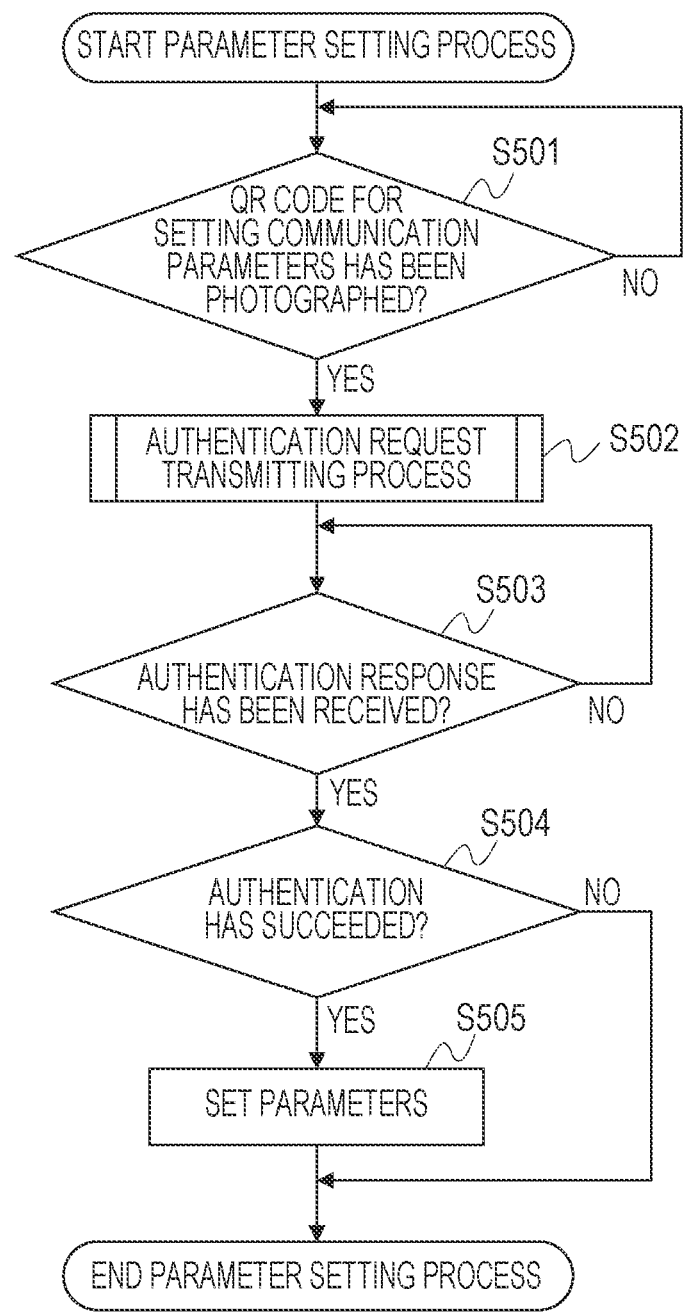
FIG. 5 is a flowchart of an exemplary operation performed by the smartphone.

FIG. 5 is a flowchart of a process performed when the smartphone 101 performs the communication-parameter setting process. The flowchart in FIG. 5 starts when a user transmits an instruction to start the communication-parameter setting process via the operation unit 203. The flowchart in FIG. 5 illustrates a process flow performed by the controller 206 reading and executing the computer programs stored in the storage unit 207. Some or all of the steps illustrated in the flowchart in FIG. 5 can be implemented by using hardware such as an application specific integrated circuit (ASIC).

When the smartphone 101 receives an instruction to start the communication-parameter setting process, the smartphone 101 photographs a QR Code® by using the image capturing unit 201, decodes the photographed QR Code®, and obtains the decoded information in S501. If the information obtained from the photographed QR Code® is information necessary to set communication parameters, the process proceeds to S502. If information necessary to set communication parameters is not included in the photographed QR Code®, the smartphone 101 can abnormally end the process. In this case, lacking information, format mismatch, and the like that cause the abnormal end are displayed on the display unit 204, improving visual effects for the user.

In S502, the smartphone 101 transmits an authentication request to the peer apparatus for which the QR Code® has been photographed. The process of transmitting an authentication request will be described in detail below by using FIG. 6. In S502, an authentication request is transmitted. If an authentication response has been received from the peer apparatus (S503), the smartphone 101 analyzes the authentication result included in the authentication response. In S504, if the analysis result of the authentication result indicates authentication success, the process proceeds to S505. If the analysis result indicates authentication failure, the communication-parameter setting process is ended. In this case, the cause of the abnormal end is displayed on the display unit 204, improving visual effects for the user.

In S505, the smartphone 101 performs the communication-parameter setting process with the peer apparatus. The communication-parameter setting process is described above, and no description will be made.

FIG. 6 is a flowchart that illustrates an authentication request transmitting process performed in the smartphone 101, and that describes S502 in FIG. 5 in detail. In S601, the smartphone 101 determines whether identification information of the target apparatus to which communication parameters are to be set has been obtained. In the present embodiment, if the QR Code® includes identification information of the setting target apparatus, the smartphone 101 determines that the identification information has been obtained. If the QR Code® does not include identification information, the smartphone 101 determines that the identification information has not been obtained. If the identification information has been obtained, the process proceeds to S602. If the identification information has not been obtained, the process proceeds to S603.

In S602, since the identification information of the target apparatus has been obtained, the smartphone 101 determines that the authentication request is to be transmitted by unicast in which the identification information of the target apparatus is specified as a destination, and the process proceeds to S604. In contrast, in S603, since the identification information of the target apparatus has not been obtained, the smartphone 101 determines that the authentication request is to be transmitted by broadcast in which a specific apparatus is not specified as a destination, and the process proceeds to S604.

For example, in the present embodiment, the QR Code® for the printer 103 includes identification information for identifying the printer 103. Therefore, the process proceeds to S602, and it is determined that an authentication request is to be transmitted by unicast. In contrast, in the present embodiment, the QR Code® for the AP 102 does not include identification information for identifying the AP 102. Therefore, it is determines that an authentication request is to be transmitted by broadcast or by multicast in which only multicast group devices are capable of receiving the authentication request.

In S604, the smartphone 101 determines whether channel information for a channel in which the authentication request is to be transmitted has been obtained. In the present embodiment, if the QR Code® includes channel information, the smartphone 101 determines that channel information used when the authentication request is transmitted to the target apparatus has been obtained. If the QR Code® does not include channel information, the smartphone 101 determines that channel information used when the authentication request is transmitted to the target apparatus has not been obtained. If channel information has been obtained, the process proceeds to S605. If channel information has not been obtained, the process proceeds to S606.

In S605, since channel information has been obtained, the smartphone 101 determines that the authentication request is to be transmitted to the target apparatus in a predetermined channel indicated by the obtained channel information, and the process proceeds to S607. In contrast, in S606, since channel information has not been obtained, the smartphone 101 determines that the authentication request is to be transmitted to the target apparatus in all channels, and the process proceeds to S607. Transmission in all channels means that an authentication request is sequentially transmitted by switching among multiple channels available for the smartphone 101.

In S607, the smartphone 101 transmits the authentication request based on the determinations made in S602, S603, S605, and S606.

In the present embodiment, determination is made depending on whether each piece of information (identification information of the target apparatus and channel information) has been obtained from a QR Code®. As long as these pieces of information are obtained before transmission of an authentication request, this is not limited to the example using a QR Code®. For example, another communication method, such as NFC or Bluetooth®, can be used to obtain these pieces of information, and it can be determined whether these pieces of information are present on the basis of a communication method, such as NFC or Bluetooth®. Similarly, an action frame can be received/transmitted to obtain these pieces of information, and it can be determined whether these pieces of information are present, depending on reception/transmission of an action frame.

In the present embodiment, the determination processes in S601 and S604 are both performed in the authentication request transmitting process in FIG. 6. Alternatively, either one of the determination processes can be performed. Further, this is not limiting, and another determination process can be performed. For example, determination as to whether the target apparatus is connected to the same network can be added. This is, for example, a case in which, when the smartphone 101 photographs the QR Code® prepared for the printer 103, the smartphone 101 and the printer 103 have been connected to the wireless network 104 constructed by the AP 102.

Assume that the smartphone 101 can register an apparatus that has been connected to the wireless network 104, in the storage unit 207. When the smartphone 101 photographs the QR Code® prepared for the printer 103 and identifies the printer 103 from information in the QR Code®, the smartphone 101 can determine that the printer 103 has been connected to the AP 102 from the information registered in the storage unit 207. In this case, the smartphone 101 can determine that an authentication request is to be transmitted to the printer 103 via the AP 102 in the wireless network 104. In addition, in a state in which channel information has been obtained, an authentication request is transmitted in the channel. When it is determined that no responses to the authentication request are received from the target apparatus, an authentication request message can be transmitted in all channels again.

In the present embodiment, an authentication request is transmitted in a process of searching for the target apparatus. Alternatively, a message such as a probe request based on the IEEE 802.11 standard can be transmitted to perform the search process. In this case, similarly to the authentication request message, switching between transmission by unicast and transmission by broadcast is made in accordance with whether identification information of the target apparatus has been obtained. Similarly, in accordance with whether channel information has been obtained, switching between transmission in the channel indicated by the channel information and transmission in all channels is also made. Other than a probe request, another frame such as an action frame for searching for the target communication apparatus can be used.

According to the present embodiment, the smartphone 101 can autonomously change the method of searching for a peer apparatus to which communication parameters are to be set, on the basis of whether identification information of the peer apparatus has been obtained and whether channel information has been obtained. This enables the communication-parameter setting process to be efficiently performed.

Modified Embodiments

In the above-described embodiment, a QR Code® to be read is not limited to a QR Code® displayed on a display unit. For example, the QR Code® can be a QR Code® attached as a label on the case of a communication apparatus, or a QR Code® attached on an instruction manual or a package such as corrugated cardboard used when the communication apparatus is sold. Alternatively, instead of a QR Code®, a bar code or a two-dimensional code other than a QR Code® can be used. Instead of machine-readable information such as a QR Code®, user-readable information such as any string can be used. The AP 102 or the printer 103 can be provided with a WEB server function, and a QR Code® can be displayed on a WEB page.

In the above-described embodiment, the case in which communication between apparatuses is performed through wireless LAN communication based on IEEE 802.11 is described. However, this is not limiting. For example, a wireless communication medium, such as Wireless USB, MBOA, Bluetooth®, ultra-wideband (UWB), ZigBee, or NFC, can be used to perform communication. MBOA stands for the Multi Band Orthogonal Frequency Division Multiplexing (OFDM) Alliance. Ultra-wideband (UWB) includes Wireless USB, Wireless 1394, and WINET.

In the above-described embodiment, the case in which the AP 102 and the printer 103 are connected to each other in the infrastructure mode of a wireless LAN is described. However, this is not limiting. For example, aspects of the present invention can be also applied to a case in which apparatuses are connected to each other in the ad hoc mode in a wireless LAN. Instead of the AP 102, a communication apparatus such as a personal computer (PC) can be used to connect the PC to the printer 103 by using Wi-Fi Direct®. Further, when the smartphone 101 and the printer 103 are provided with a connection function using Wi-Fi Direct®, the smartphone 101 and the printer 103 can be connected to each other in Wi-Fi Direct®. In this case, after completion of setting of communication parameters, either one of the smartphone 101 and the printer 103 operates as a group owner in Wi-Fi Direct® which serves as an AP, and constructs a wireless network by using shared communication parameters. The other one of the apparatuses that is not a group owner is connected to the group owner as a client in Wi-Fi Direct®, whereby a connection in Wi-Fi Direct® can be established.

Aspects of the present invention can also be achieved by performing a process in which a program for achieving one or more functions according to the above-described embodiments is supplied to a system or apparatus over a network or via a storage medium and in which one or more processors in a computer in the system or apparatus read and execute the program. Aspects of the present invention can also be achieved by using a circuit (such as an ASIC) achieving one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A communication apparatus comprising:
one or more processors; and
one or more memories including instructions that, when executed by the one or more processors, cause the communication apparatus to:
acquire, through wireless communication, information about a communication-parameter;
determine whether the acquired information includes channel information;
select performing transmission of a signal via a plurality of available channels in a case where it is determined that the acquired information does not include the channel information, and select performing transmission of a signal via the channel based on the channel information in a case where it is determined that the acquired information includes the channel information; and transmit a signal via a plurality of available channels in a case where the performing the transmission of the signal via the plurality of available channels is selected, and transmit a signal via the channel based on the channel information in a case where the performing the transmission of the signal via the channel based on the channel information is selected.

2. The communication apparatus according to claim 1, wherein the instructions further cause the communication apparatus to provide a communication parameter used to perform wireless local-area network communication based on an IEEE 802.11 series standard.

3. The communication apparatus according to claim 2, wherein the communication parameter is used for communicating with an access point in a wireless local-area network in which the communication apparatus participates.

4. The communication apparatus according to claim 1, wherein the channel information indicates just one channel.

5. A communication method for a communication apparatus, the communication method comprising:
  acquiring, through wireless communication, information about a communication-parameter;
  determining whether the acquired information includes channel information;
  selecting performing transmission of a signal via a plurality of available channels in a case where it is determined that the acquired information does not include the channel information, and selecting performing transmission of a signal via the channel based on the channel information in a case where it is determined that the acquired information includes the channel information; and
  transmitting a signal via a plurality of available channels in a case where the performing the transmission of the signal via the plurality of available channels is selected, and transmitting a signal via the channel based on the channel information in a case where the performing the transmission of the signal via the channel based on the channel information is selected.

6. A non-transitory computer-readable storage medium storing computer executable instructions for causing a communication apparatus to perform a process, the process comprising:
  acquiring, through wireless communication, information about a communication-parameter;
  determining whether the acquired information includes channel information;
  selecting performing transmission of a signal via a plurality of available channels in a case where it is determined that the acquired information does not include the channel information, and selecting performing transmission of a signal via the channel based on the channel information in a case where it is determined that the acquired information includes the channel information; and
  transmitting a signal via a plurality of available channels in a case where the performing the transmission of the signal via the plurality of available channels is selected, and transmitting a signal via the channel based on the channel information in a case where the performing the transmission of the signal via the channel based on the channel information is selected.

7. The communication apparatus according to claim 1, wherein the acquired information further includes a service set identifier (SSID).

8. The communication apparatus according to claim 1, wherein the communication apparatus is a printer.

9. The communication apparatus according to claim 1, wherein the communication apparatus is a digital camera.

10. The communication apparatus according to claim 1, wherein the acquired information further includes an encryption key.

11. The communication apparatus according to claim 1, wherein the wireless communication is near field communication (NFC).

12. The communication apparatus according to claim 1, wherein the wireless communication is communication conforming to Bluetooth®.

13. The communication apparatus according to claim 1, wherein the channel information is channel information of wireless LAN.

* * * * *